Patented Jan. 1, 1952

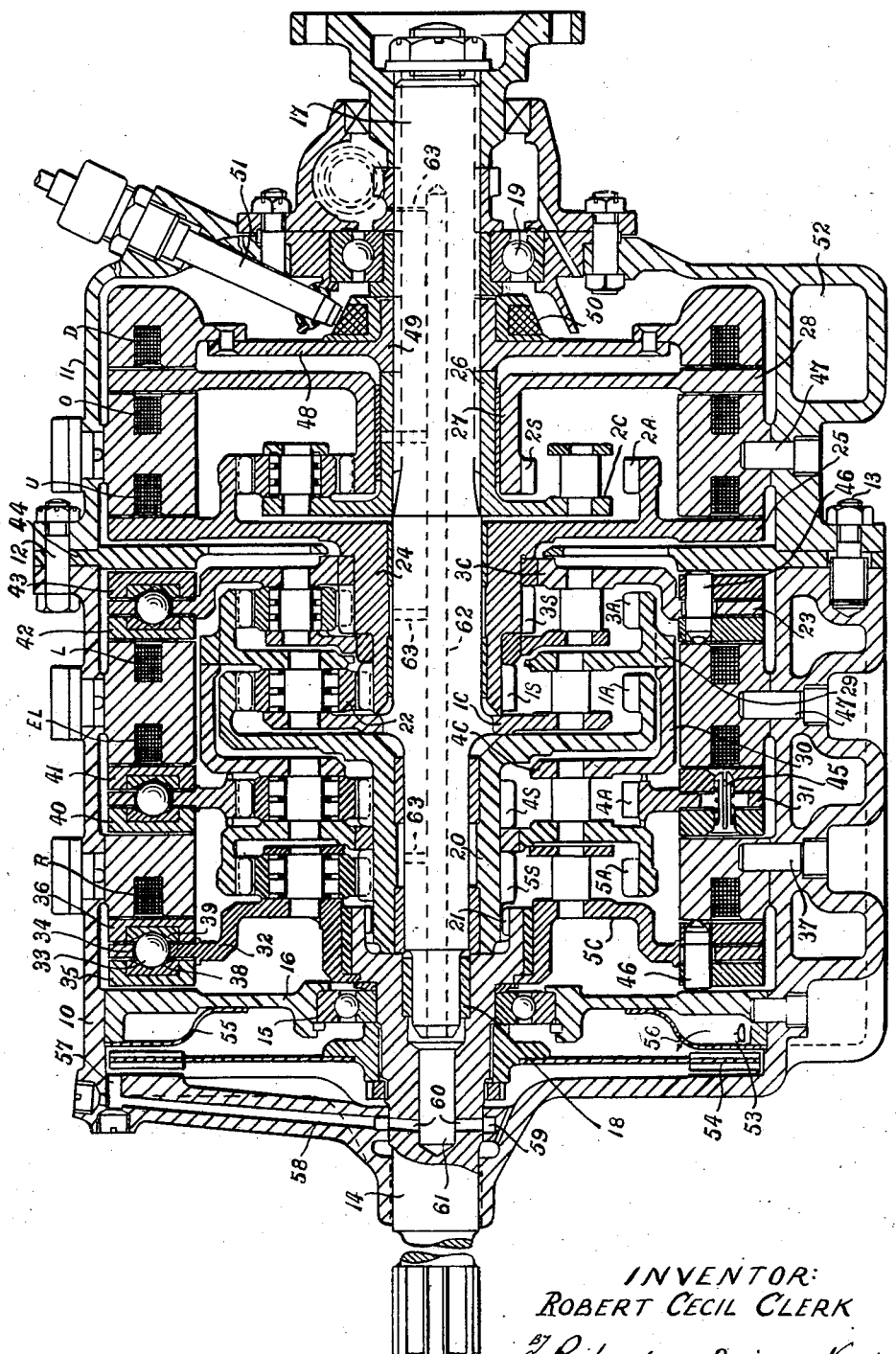

2,580,656

UNITED STATES PATENT OFFICE 2,580,656

PLANETARY CHANGE-SPEED GEAR

Robert Cecil Clerk, Richmond, England

Application November 17, 1949, Serial No. 127,869
In Great Britain January 2, 1948

9 Claims. (Cl. 74—759)

This invention relates to planetary multi-speed transmission of the type having compounded gear trains.

An object of this invention is to provide a form of planetary multi-speed gear in which the transmission trains can be of the simple type consisting of a sun wheel, an annulus gear and planet wheels each meshing with the sun wheel and the annulus gear, which enables the design to be easily modified in order to vary the gear ratios available, and which provides high efficiencies without the use of heavily loaded elements running at speeds which are high relative to the speed of the driving element of the gearing.

Another object is to provide a close-ratio multi-speed transmission especially suitable for use in the main power transmission systems of vehicles driven by internal-combustion engines.

Another object is to provide a transmission which is reasonably compact and light and which requires only one stop or clutch to be engaged in order to establish each of several speed ratios.

Another object is to enable a transmission having the foregoing features to be electrically controlled.

The accompanying drawing is a sectional side elevation of an example of a transmission constructed in accordance with the invention for use on automobiles and yielding five forward speed ratios and a reverse ratio between a driving element and a driven element. The transmission includes a first planetary gear train having an annulus gear coupled to the driving element, a sun wheel serving as a reaction element, and a planet-carrier coupled to the driven element and carrying planet wheels each meshing with the annulus gear and the sun wheel, a second planetary gear train having an annulus gear coupled to the sun wheel of the first train, a sun wheel serving as a reaction element, and a planet-carrier coupled to the driven element and carrying planet wheels each meshing with the annulus gear and the sun wheel, a controllable friction brake for arresting rotation of the sun wheel of the first train to yield an underdrive speed ratio, a controllable friction brake for arresting rotation of the sun wheel of the second train and thereby causing these trains to operate compounded and to yield an overdrive speed ratio, and friction clutch means adapted to lock these trains solid by coupling together the sun wheel and the planet-carrier of the second train to yield direct drive. The transmission also includes a third planetary gear train having an annulus gear coupled to the planet-carrier of the first train, a sun wheel coupled to the sun wheel of the first train, and a planet-carrier serving as a reaction element and carrying planet wheels each meshing with the annulus gear and the sun wheel, and a controllable friction brake for arresting rotation of this planet-carrier and thereby causing the first and third trains to operate compounded and to yield a low-speed ratio. A fourth planetary gear train has an annulus gear serving as a reaction member, a sun wheel coupled to the driving element, and a planet-carrier coupled to the driven element and carrying planet wheels each meshing with the annulus gear and the sun wheel, and a controllable friction brake for arresting rotation of this annulus gear and thereby providing an emergency low gear by the aid of the fourth train alone. A fifth planetary gear train, adapted to yield a reverse ratio, has a sun wheel coupled to the driving element, an annulus gear coupled to the driven element, and a planet-carrier serving as a reaction element and carrying planet wheels each meshing with the annulus gear and the sun wheel, and a controllable friction brake for arresting rotation of this planet-carrier.

A gear case consists of front and back cupped castings 10 and 11 having flanged lips and fixed together mouth to mouth by bolts and studs such as 12 and 13 passing through or engaged in the flanges. A driving shaft 14, having its front end carried by a bearing not shown, is supported in a bearing 15 housed in a diaphragm wall 16 fixed inside the gear case part 10. A driven shaft 17 is supported at its front end by a bearing 18 in the driving shaft 14 and at its rear end by a bearing 19 in the rear end wall of the gear case.

The above-mentioned five planetary gear trains are arranged one behind another in the following order from front to rear of the gear case: fifth, fourth, first, third and second. Reference S denotes the sun wheel of each train, C the planet-carrier and A the annulus gear, these references in each case being preceded by the numeral 1, 2, 3, 4 or 5 identifying the number of the train.

All the controllable brakes and the clutch are constituted by electromagnetically-operated friction devices including an annular electromagnet of channel section adapted to be frictionally engaged with an annular armature.

The annulus gear 1A is in a rearwardly opening drum integral with a hollow shaft 20 which is rotatable on the driven shaft 17 and coupled by splines 21 to an internally splined rear end portion of the driving shaft. The planet-carrier 1C includes a disk fixed to the driven shaft and having rearwardly projecting pins carrying the planet pinions such as 22. A rearward extension of the planet-carrier IC is rigid with the annulus gear 3A of the third train. The planet-carrier 3C of the third train is connected at its rear part to a cage disk 23 forming part of the rotary element of the brake that is engaged to establish the low speed (second gear) ratio.

The sun wheels IS and 3S of the first and third trains are integral with a hollow shaft 24 journalled on the driven shaft and capable of a limited sliding movement on this shaft; to the rear end of the shaft 24 are fixed the armature 25 of the underdrive (third gear) ratio brake and the annulus gear 2A of the second train. The planet-carrier 2C of this train includes a disk having a hub 26 splined to the driven shaft, the disk being placed in front of the train. The sun gear 2S of the second train is rigid with a short hollow shaft 27 which is journalled on the hub 26 and capable of a limited sliding movement on this hub. Integral with the rear end of the hollow shaft 27 is an armature 28 which is used for the overdrive (fifth gear) ratio brake and also for an electromagnetically-operated friction clutch used for establishing the direct-drive (fourth gear) ratio.

The sun wheels 4S and 5S of the fourth and fifth trains are integral with the hollow shaft 20. The part of the planet-carrier IC of the first train that extends to the annulus gear 3A is keyed at 29 to a cylindrical shell 30 extending forward around the annulus gear of this train and fixed to the rear part of the planet-carrier 4C of the fourth train. The annulus gear 4A of the fourth train is coupled to a cage disk 31 forming part of the rotary element of the brake that establishes the emergency low (first gear) ratio. The annulus gear 5A of the fifth (reversing) train is a forwardly opening drum forming a front part of the planet-carrier 4C of the fourth train. The planet-carrier 5C of the fifth train includes a cage disk 32 forming part of the rotary element of the reverse train brake.

The three brakes that are engaged respectively to establish reverse, emergency low and low speeds are of the torque-assisted type forming the subject of my patent application, Serial No. 34,781, filed June 23, 1948. The cage disk 32 of the reverse-speed brake carries three or more uniformly distributed balls, such as 33, mounted in cylindrical bores, such as 34, in the disk, so that they are constrained to slide in directions parallel to the gear axis. Two friction rings 35 and 36 are disposed between the cage disk 32 and respectively the diaphragm wall 16 and the concentric annular pole-pieces of a U-section electromagnet R which is locked in the gear case by dowels such as 37. Each of the balls 33 co-operates with two conical camming pockets, such as 38 and 39, in the rings 35 and 36 respectively.

The emergency low speed brake is arranged similarly to the reverse brake, and include friction rings 40 and 41 between its cage disk 31 and respectively the back of the magnet R and a fixed annular electromagnet EL located by dowels such as 47. Likewise the low speed brake includes friction rings 42 and 43 between its cage disk 23 and respectively an annular electromagnet L formed on the back of the magnet EL and a fixed friction ring 44 clamped between the two parts of the gear case. In each of these brakes the two rotary friction rings are tied together by spring tension links, such as 45, and fitted with disengaging spring plungers, such as 46, which also act as dowels constraining the two rings to rotate together, as described in detail in my said patent application.

The armature 25 co-operates with a fixed annular electromagnet U located by dowels, such as 47, and the armature 28 co-operates alternatively with an electromagnet O formed on the back of the magnet U and with an annular electromagnet D carried by a disk 48 having a hub 49 splined to the driven shaft 17. Each of the brake magnet windings has one end grounded and the other end connected to a separate terminal (not shown). The clutch winding has one end grounded and the other connected to an insulated slip ring 50 cooperating with a brush mounted in a brush-holder terminal 51. A control switch (not shown) enables any of the magnets to be energised one at a time.

The lower half of the gear case has double walls which contain an oil sump 52. Holes such as 53 form oil passages between the sump and a pump compartment. An oil circulating pump consists of a vaned impeller 54 fixed to the driving shaft 14 and operating in an annular channel formed between the front wall of the gear case and a pressed sheet metal ring 55 clamped at its periphery by the diaphragm member 16. Oil enters the pump through the hole 53 and a port 56 in the ring 55 and is forced by the impeller 54 through a delivery port 57 and a duct 58 to an annular chamber 59 in a plain bearing formed in the front wall of the gear case. Radial ports 60 in the driving shaft 14 lead from the chamber 59 to an axial bore 61 in this shaft, whence the oil is delivered through an axial bore 62 and radial bores 63 in the driven shaft 17 to various parts of the gearing. Scavenging of the gear case proper to the sump is effected by the rotating magnet D and the cage disk 32 which pick up surplus oil and fling it into holes or slots leading tangentially from the gear case proper to the uppermost part of the sump at the side where the peripheries of the parts D and 32 are moving downwards.

In the example shown all the annulus gears have sixty-one teeth; the suns IS, 4S and 5S have twenty-three teeth; the suns 2S and 3S have twenty-nine teeth. The following are the speed ratios obtained.

| | Emergency Low | Low | Underdrive | Direct | Overdrive | Reverse |
|---|---|---|---|---|---|---|
| Speed ratio | 3.65/1 | 2.17/1 | 1.38/1 | 1/1 | 0.823/1 | 2.65/1 |

When the driving shaft 14 is rotating, and when the driven shaft 17 is held stationary by the load, no magnet being energised, annulus gear 5A and planet-carrier 4C are held stationary through parts 30, 29 and IC. Since suns 5S and 4S are rotated directly by the driving shaft, cage disk 32 is driven idly forward and cage disk 31 idly backward. If now magnet R is energised, ring 36, acting as an armature, is drawn into frictional engagement with magnet R so that rings 35 and 36 are caused to lag in relation to disk 32. Balls 33 accordingly ride up the camming pockets 38 and 39 and force these rings axially apart into full frictional engagement with parts 16 and R, so that the rotation of disk 32 is arrested and consequently annulus gear 5A is driven backward at a reduced speed, taking with it the driven shaft.

The emergency low and low speed brakes operate similarly to the reverse brake; the other brakes and the clutch are more lightly loaded and are therefore not of the torque-assisted type.

When magnet EL only is energised, annulus gear 4A is held stationary, and gear train 4 operates as a simple wide-ratio underdrive planetary unit.

When magnet L only is energised, planet-carrier 3C is thereby held stationary. Annulus gear 1A is directly driven by the driving shaft, so that sun 1S is urged to rotate backward and planet-carrier 1C and with it annulus gear 3A are urged to rotate forward. Since planet-carrier 3C is fixed, sun 3S is urged to rotate backward with sun 1S. Trains 1 and 3 therefore operate compounded to impart a forward rotation to the driven shaft at low speed.

When magnet U only is energised, sun 1S is thereby held stationary and train 1 operates as a simple close-ratio underdrive planetary unit.

When clutch magnet D only is energised, sun 2S is clutched to planet-carrier 2C so that train 2 is locked solid and so locks sun 1S to the driven shaft; train 1 is therefore also locked solid so that its annulus gear 1A, which is directly driven by the driving shaft, drives the driven shaft directly.

When magnet O only is energised, sun 2S is thereby held stationary. Planet-carriers 1C and 2C are constrained to rotate forward with the driven shaft. Driving torque is applied to the driven shaft by train 1, the reaction of which is a backward torque on the sun 1S. Forward rotation imparted by this driving torque to the driven shaft causes annulus gear 2A and with it sun 1S to be rotated forward faster than the driven shaft, the effective torque on the driven shaft being that applied through the planet-carrier 1C less that applied through the planet-carrier 2C. Thus trains 1 and 2 operate compounded to impart to the driven shaft a speed exceeding that of the driving shaft.

The term "coupled" used in the following claims means that the two elements so described are incapable of relative rotation at least in normal operation of the gearing on a ratio requiring such coupling; this term does not however exclude the use of a connection which is disengageable in particular circumstances, e. g. a free-wheel coupling.

I claim:

1. A planetary multi-speed transmission including a driving element and a driven element, a first planetary gear train having an annulus gear coupled to the driving element, a sun wheel serving as a reaction element, and a planet-carrier coupled to the driven element and having rotatably mounted thereon planet wheels each meshing with the annulus gear and the sun wheel, a second planetary gear train having an annulus gear coupled to the sun wheel of the first train, a sun wheel serving as a reaction element, and a planet-carrier coupled to the driven element and having rotatably mounted thereon planet wheels each meshing with the annulus gear and the sun wheel, a controllable stop for arresting rotation of the sun wheel of the first train to yield an underdrive speed ratio, a controllable stop for arresting rotation of the sun wheel of the second train and thereby causing these trains to operate compounded and to yield an overdrive speed ratio, and clutch means capable of locking these trains to yield a 1-to-1 ratio drive.

2. A transmission as claimed in claim 1, wherein said clutch means are capable of coupling together the sun wheel and the planet-carrier of the second train.

3. A transmission as claimed in claim 1, and including a third planetary gear train having an annulus gear coupled to the planet-carrier of the first train, a sun wheel coupled to the sun wheel of the first train, and a planet-carrier serving as a reaction element and having rotatably mounted thereon planet wheels each meshing with the annulus gear and the sun wheel, and a controllable stop for arresting rotation of the planet-carrier of the third train and thereby causing the first and third trains to operate compounded and to yield a low-speed ratio.

4. A transmission as claimed in claim 1, and including a further planetary gear train having an annulus gear serving as a reaction member, a sun wheel coupled to the driving element, and a planet-carrier coupled to the driven element and having rotatably mounted thereon planet wheels each meshing with the annulus gear and the sun wheel, and a controllable stop for arresting rotation of the last-mentioned annulus gear and thereby providing an emergency low gear by the aid of said further train alone.

5. A transmission as claimed in claim 1, and including a planetary gear train adapted to yield a reverse ratio and having a sun wheel coupled to the driving element, an annulus gear coupled to the driven element, and a planet-carrier serving as a reaction element and having rotatably mounted thereon planet wheels each meshing with the annulus gear and the sun wheel, and a controllable stop for arresting rotation of the planet-carrier of the reverse train.

6. A transmission as claimed in claim 1, and including a third planetary gear train having an annulus gear coupled to the planet-carrier of the first train, a sun wheel coupled to the sun wheel of the first train, and a planet-carrier serving as a reaction element and having rotatably mounted thereon planet wheels each meshing with the annulus gear and the sun wheel, a controllable stop for arresting rotation of the plane-carrier of the third train and thereby causing the first and third trains to operate compounded and to yield a low-speed ratio, a fourth planetary gear train having an annulus gear serving as a reaction member, a sun wheel coupled to the driving element, and a planet-carrier coupled to the driven element and having rotatably mounted thereon planet wheels each meshing with the annulus gear and the sun wheel, and a controllable stop for arresting rotation of the annulus gear of said fourth train and thereby providing an emergency low gear by the aid of the fourth train alone.

7. A transmission as claimed in claim 1, and including a third planetary gear train having an annulus gear coupled to the planet-carrier of the first train, a sun wheel coupled to the sun wheel of the first train, and a planet-carrier serving as a reaction element and having rotatably mounted thereon planet wheels each meshing with the annulus gear and the sun wheel, a controllable stop for arresting rotation of the planet-carrier of the third train and thereby causing the first and third trains to operate compounded and to yield a low-speed ratio, a planetary gear train adapted to yield a reverse ratio and having a sun wheel coupled to the driving element, an annulus gear coupled to the driven element, and a planet carrier serving as a reaction element and having rotatably mounted thereon planet wheels each meshing with the annulus gear and the sun wheel, and a controllable stop for arresting rotation of the planet-carrier of the reverse train.

8. A transmission as claimed in claim 1, and including a third planetary gear train having an annulus gear coupled to the planet-carrier of the first train, a sun wheel coupled to the sun wheel of the first train, and a planet-carrier serving as a reaction element and having rotatably mounted thereon planet wheels each meshing with the annulus gear and the sun wheel, a controllable stop for arresting rotation of the planet-carrier of the third train and thereby causing the first and third trains to operate compounded and to yield a low-speed ratio, a fourth planetary gear train having an annulus gear serving as a reaction member, a sun wheel coupled to the driving element, and a planet-carrier coupled to the driven element and having rotatably mounted thereon planet wheels each meshing with the annulus gear and the sun wheel, a controllable stop for arresting rotation of the annulus gear of said fourth train and thereby providing an emergency low gear by the aid of the fourth train alone, a fifth planetary gear train adapted to yield a reverse ratio and having a sun wheel coupled to the driving element, an annulus gear coupled to the driven element, and a planet-carrier serving as a reaction element and having rotatably mounted thereon planet wheels each meshing with the annulus gear and the sun wheel, and a controllable stop for arresting rotation of the planet-carrier of the fifth train.

9. A planetary multi-speed transmission having a driving element projecting from its front end and a driven element projecting from its rear end coaxially with the driving element, the transmission also including a first planetary gear train having an annulus gear coupled to the driving element, a sun wheel serving as a reaction element, and a planet-carrier coupled to the driven element and having rotatably mounted thereon planet wheels each meshing with the annulus gear and the sun wheel, a second planetary gear train disposed behind the first train and having an annulus gear coupled to the sun wheel of the first train, a sun wheel serving as a reaction element, and a planet-carrier coupled to the driven element and having rotatably mounted thereon planet wheels each meshing with the annulus gear and the sun wheel, a controllable stop for arresting rotation of the sun wheel of the first train to yield and underdrive speed ratio, a controllable stop for arresting rotation of the sun wheel of the second train and thereby causing these trains to operate compounded and to yield an overdrive speed ratio, clutch means capable of locking these trains solid to yield a 1-to-1 ratio drive, a third planetary gear train disposed between said first and second trains and having an annulus gear coupled to the planet-carrier of the first train, a sun wheel coupled to the sun wheel of the first train, and a planet-carrier serving as a reaction element and having rotatably mounted thereon planet wheels each meshing with the annulus gear and the sun wheel, a controllable stop for arresting rotation of the planet-carrier of the third train and thereby causing the first and third trains to operate compounded and to yield a low-speed ratio, a fourth planetary gear train disposed in front of the first train and having an annulus gear serving as a reaction member, a sun wheel coupled to the driving element, and a planet-carrier coupled to the driven element and having rotatably mounted thereon planet wheels each meshing with the annulus gear and the sun wheel, a controllable stop for arresting rotation of the annulus gear of said fourth train and thereby providing an emergency low gear by the aid of the fourth train alone, a fifth planetary gear train disposed in front of said fourth train and adapted to yield a reverse ratio and having a sun wheel coupled to the driving element, an annulus gear coupled to the driven element, and a planet-carrier serving as a reaction element and having rotatably mounted thereon planet wheels each meshing with the annulus gear and the sun wheel, and a controllable stop for arresting rotation of the planet-carrier of the fifth train.

ROBERT CECIL CLERK.

REFERENCES CITED

The following references are of record in the file of this patent:

UNITED STATES PATENTS

| Number | Name | Date |
| --- | --- | --- |
| 1,404,675 | Wilson | Jan. 24, 1922 |
| 2,084,522 | Cotal | June 22, 1937 |
| 2,123,770 | Cotal | July 12, 1938 |

FOREIGN PATENTS

| Number | Country | Date |
| --- | --- | --- |
| 300,667 | Great Britain | Nov. 9, 1928 |
| 625,318 | Great Britain | June 24, 1949 |